United States Patent [19]
Rhinehart et al.

[11] 3,785,345
[45] Jan. 15, 1974

[54] AUTOMATED SYSTEMS FOR RAISING AND TRANSPORTING BROILERS

[75] Inventors: Vance E. Rhinehart, Apison; James D. Coffelt, Soddy; Floyd G. Yother, Daisy, all of Tenn.

[73] Assignee: Cumberland Corporation, Chattanooga, Tenn.

[22] Filed: Feb. 2, 1972

[21] Appl. No.: 222,821

[52] U.S. Cl.................................... 119/18, 119/22
[51] Int. Cl............................................ A01k 31/00
[58] Field of Search........................ 119/18, 17, 22

[56] References Cited
UNITED STATES PATENTS

| | | | |
|---|---|---|---|
| 3,292,581 | 12/1966 | Van Nest | 119/17 |
| 3,396,702 | 8/1968 | Trussell | 119/17 |
| 3,312,194 | 4/1967 | Ernst | 119/22 |

*Primary Examiner*—Hugh R. Chamblee
*Attorney*—John W. Malley et al.

[57] ABSTRACT

An animal raising system, particularly for fowl such as chickens, which includes a plurality of cages disposed on a frame in a plurality of rows, one row above the other. Each cage preferably has two members attached to opposing cage walls at the top thereof and movable from a first position in which the members provide a vertical extension of the walls to which they are attached, thus permitting proper grow-out and leaving the cage top open, to a second position closing the cage top for transportation at an appropriate cage height. Further, drop tubes for food and water extend into each cage through the open top and are pivotable out of the cage about a trough and water line to which they are respectively attached. The cage tops in at least one row are closed by a dropping collecting board which also collects droppings from the row of cages above. A scraper blade is movable along the board for periodically removing droppings and for pushing, with an attachment, the cages along the rails on which they rest for transportation.

17 Claims, 7 Drawing Figures

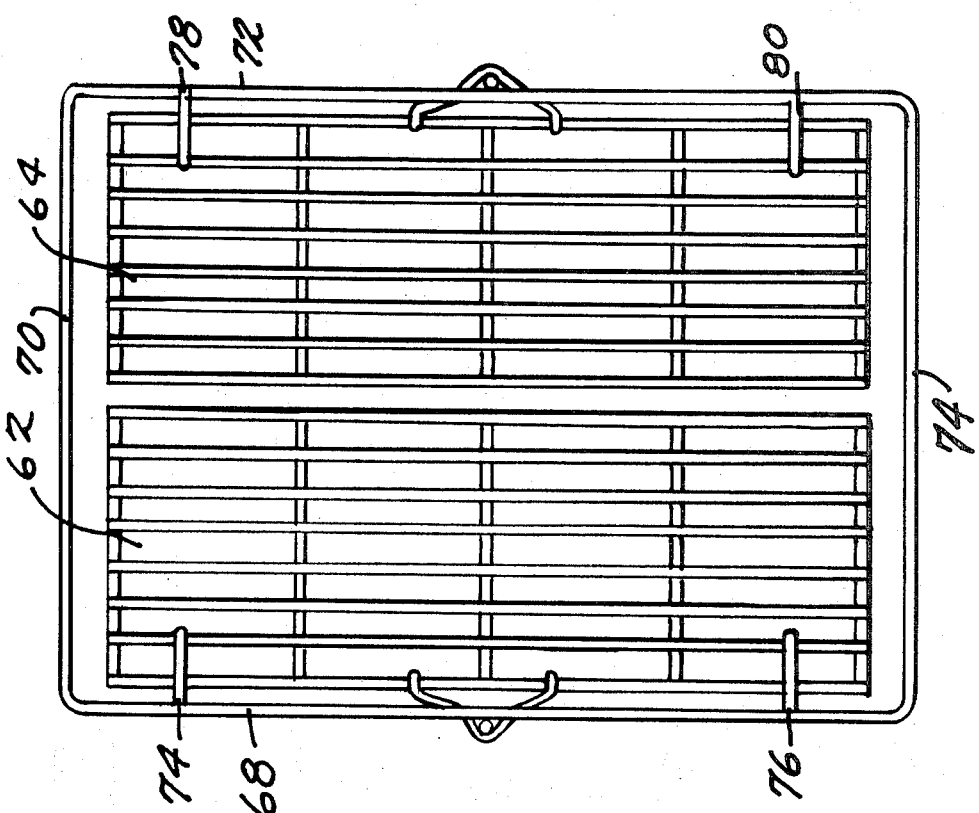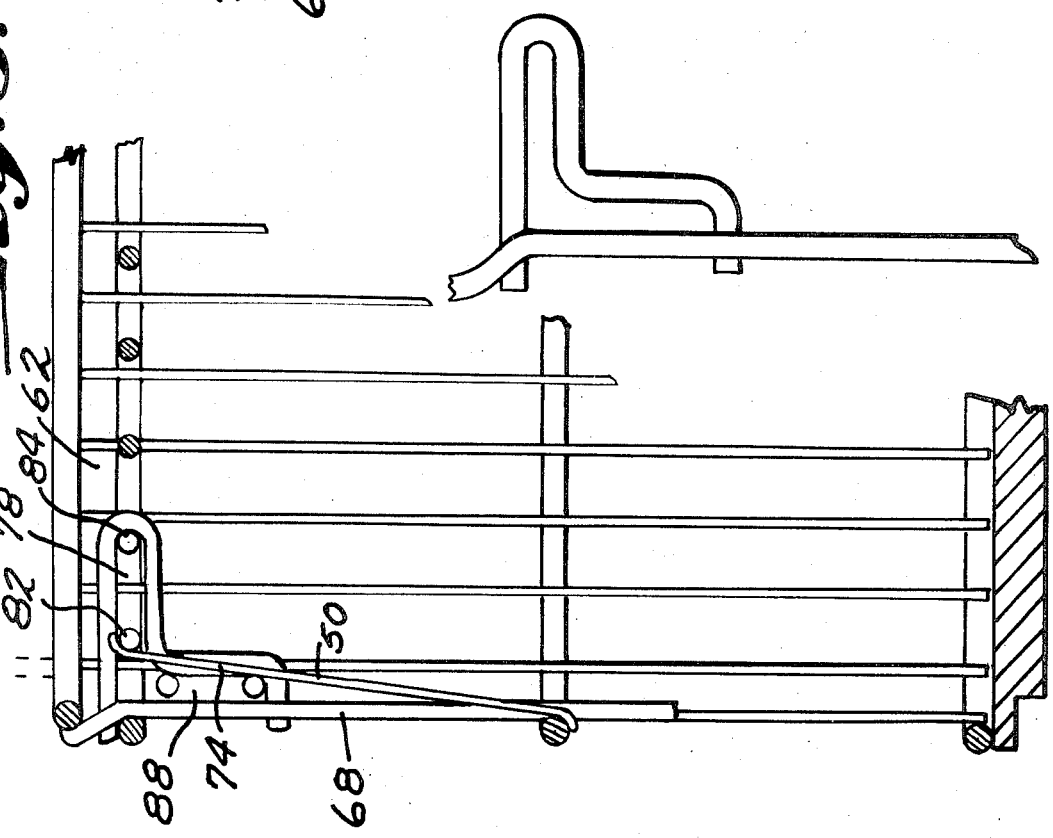

AUTOMATED SYSTEMS FOR RAISING AND TRANSPORTING BROILERS

BRIEF DESCRIPTION OF THE PRIOR ART AND SUMMARY OF THE INVENTION

The invention relates to a cage and system for raising and transporting animals such as poultry.

Because of the trend toward automation in the production of poultry and other animals, the critical shortage of labor at a reasonable cost, sanitation problems and other factors, the tendency in recent years has been toward the total rearing of poultry in cages. While difficulties such as cannibalism, poor feathering and breast blisters have in the past thwarted efforts to raise broilers, in particular, in cages, many of these difficulties have now been resolved. The perplexing problem of breast blisters in particular, have been extensively reduced, if not eliminated, by the use of plastic floors for the coops instead of wire floors. In this regard, reference is made to an article by Ray Lloyd in BROILER INDUSTRY, Apr. 1970, pages 55–57.

One of the drawbacks in approaches now used for growing broilers and other poultry in cages is that the poultry must be manually handled several times during growth, a time-consuming and expensive operation which also introduces the risk of damage or contamination of poultry. Usually the chicks are grown in small cages and then transferred before completely grown to other cages where they grow to processing size. When the birds are ready to be processed, they are removed from the coops in which they have grown full size and placed in transporting coops which are frequently made of plastic and are provided with a lid on the top for placing and removing the birds. While a coop height of at least 14-inches is required for complete grow-out of broilers, only about 9-inches of height is required for transporting the birds. In general, less room is required for transporting than rearing any poultry, and it is important that minimum space be used in transporting to reduce the cost thereof. Hence, transporting poultry in the coop in which they are now raised is efficient because of the greater height of the coops. At the processing plant, the birds are manually removed by opening the door on the top of the transporting coop and reaching in to grab the feet of each of the birds in the coop in turn.

The present invention relates to a cage especially designed for raising poultry such as chicken and to a system for raising and transporting such animals in which the birds can be completely raised from chick to full growth within the same cage, and that same cage then used to transport the birds to the processing plant. The birds need never leave the cage between the time at which they are initially placed in the cage as chicks and the time at which they are removed for processing.

In poultry raising systems which have been used in the past, cages containing the poultry are disposed along a trough through which solid food is moved by means of a chain or auger. The birds then extend their heads through the vertical bars which define the cage to eat the food which moves along the trough. One of the past problems in raising poultry from small chicks to their full size in a single cage or coop, is that a separation between adjacent, vertical bars which will permit small chicks to extend their heads to eat, and yet not escape from the coop into the feeding trough is not sufficient for a full grown bird to extend its head through the same space. In the past guards have been provided between the feeding trough and the cage front to prevent the escape of chicks. Such arrangements are described, for example, in the patents to Boran, U.S. Pat. No. 3,490,418, and Maxfield, U.S. Pat. No. 3,478,721.

In a co-pending application entitled AUTOMATED SYSTEMS FOR RAISING AND TRANSPORTING BROILERS by Vance Rhinehart, Ser. No. 222,805 filed on the same date as this application.

One solution to this problem is described whereby each cage wall includes two telescoping members which are movable vertically with respect to each other and which have vertical bars disposed alternately so that the members can be moved with respect to each other from a first position in which adjacent bars have a first separation which is large enough for the chicks to extend their heads for feeding and an interior volume sufficient for such young birds to satisfactory grow, to a second position in which adjacent vertical bars in at least a portion of the coop have a greater separation which is large enough for grown birds to extend their heads for feeding and for which provides an interior volume sufficient for such larger fowl. Thus, the interior volume of the cage and the separation between vertical bars can be varied from what is suitable for small chicks to what is suitable for larger birds, so that the chicks need not be transferred to another coop; instead the coop itself can be simply and quickly adjusted.

Further, according to another aspect of the above mentioned application, each cage is provided with two portions, one of which includes a floor, sides extending upward from the floor to an open top. The second portion of the coop closes at the top and preferably also includes further sides for extending the height of the coop and increasing the interior volume to an amount suitable for raising the chicks to full growth. The second portion is removably attached and can be simply removed to reduce the height of the coop for transporting the poultry to market. The open coops with the poultry therein can be stacked one on top the other on a truck or the like so that the bottom of each of the first portions of the coop closes the top of the first portion below it with the first portion of each stack on the top being closed by a second portion or any other suitable cover. Accordingly, poultry can thus be raised and transported efficiently in the same cage without unnecessary manual handling.

The present invention of this application relates to a similar system and a cage whereby small chicks can be grown to their proper size inside a cage whose interior volume can be reduced for transportation. According to one aspect of the invention as described in detail below, each cage includes a floor, preferably of plastic, with four walls extending upward from the floor and having a separation between vertical bars which is insufficient for small chicks to slip out of the cage. Two members, likewise comprised of bars, attached to opposing walls at the top thereof by a clip so that the members can be manually moved from a first position in which they provide a vertical extension of the walls to which they are attached by the clip for permitting adequate grow-out of the fowl to a second position closing at the top of the cage. The clips define respective horizontal and vertical channels, with the channels in communication for shifting the members from one position to the other, and so that the members cannot be lifted upward by the fowl when the members are in their position closing at the top of the cage.

Further, according to another aspect of the invention cages are normally disposed in rows with the rows being mounted on a frame one above the other. The cages are normally open at the top with a feed trough extending adjacent each row of the cage and having drop tubes pivotably connected to the trough and extending down into the cage for feeding the fowl therein. Similarly, a water line runs along each row providing water for each of the cages via water-drop tubes which extend into the cages and which are pivotably attached to the water line. The food and water-drop tubes can be pivoted out of the cage before closing the top thereof for transportation.

According to a further aspect of the invention, when the cages are in place on the frame while the poultry is growing the tops of the cages are preferably closed by a drop-board which accumulates droppings from the row of cages above it and which prevents the fowl from escaping from the row of cages below it. A scraper is preferably disposed for movement along each drop-board for scraping the droppings into a trough or the like disposed below the cage. The rows of cages preferably rest on rails which permit movement of the cages along the length of the rails. A simple attachment can be connected to the scraper mechanism for shoving the cages along the length of the rails to the end therof where they can be removed and their tops closed for transportation to a processing facility.

Many other objects and purposes of the invention will be clear from the following detailed description of the drawings.

BRIEF DESCRIPTION OF THE DRAWINGS

FIG. 6 shows a side view of a portion of one of the cages.

FIG. 7 shows a top view of the cages with the top closed by the adjustable members.

DETAILED DESCRIPTION OF THE DRAWINGS

Figure 1:
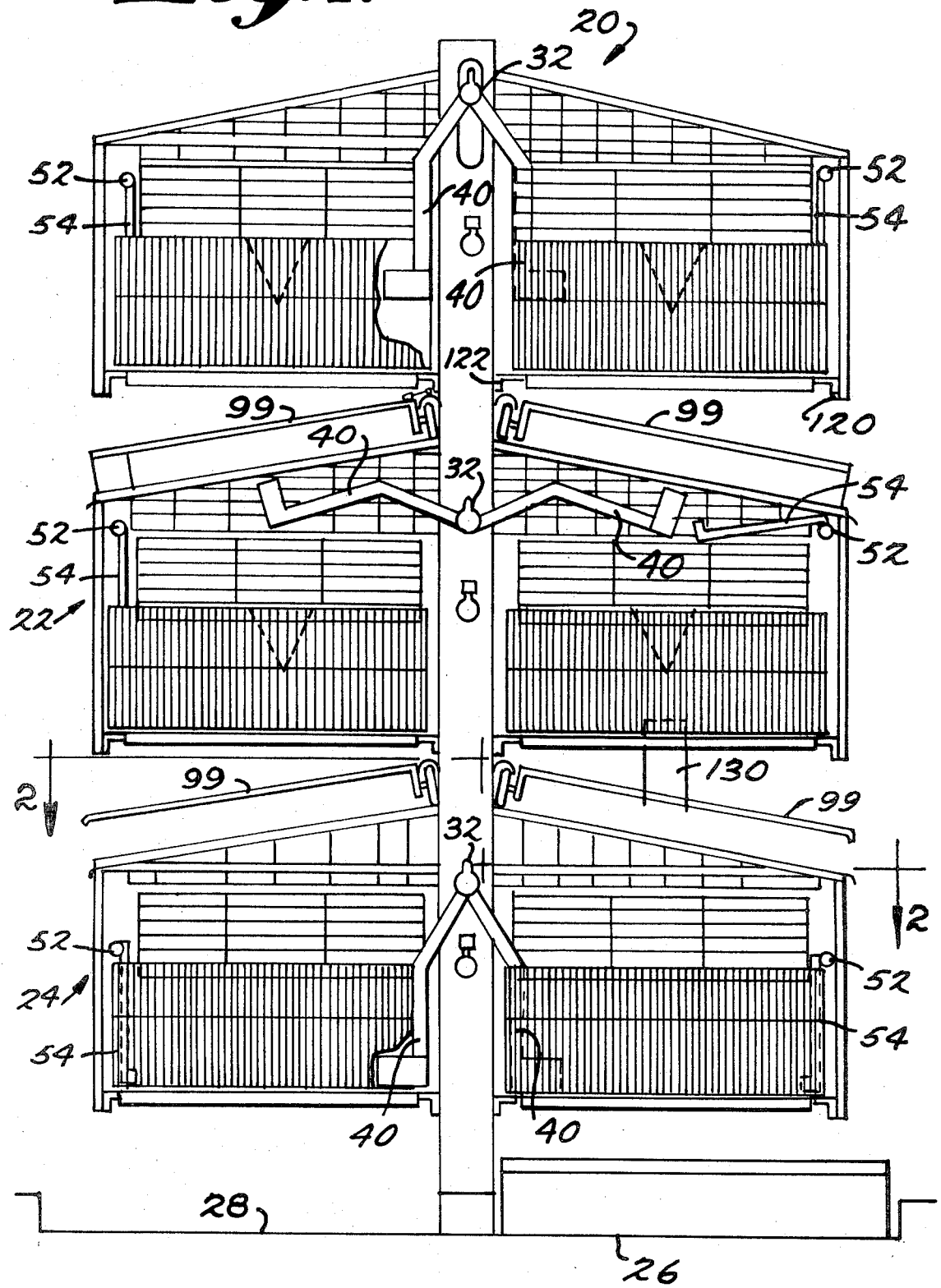
FIG. 1 shows an end view of a plurality of rows of cages disposed according to the novel system of this invention.
Figure 2:
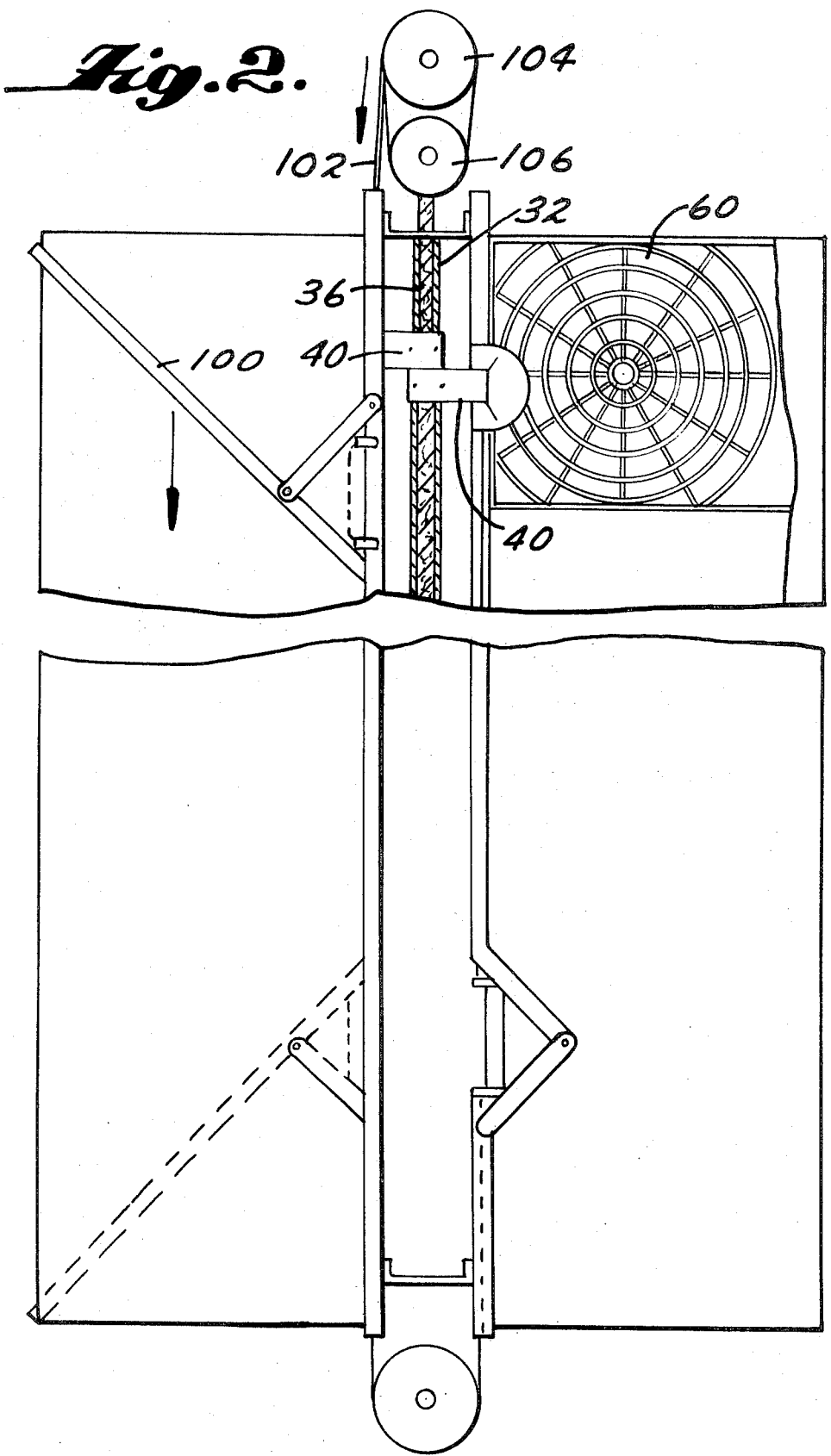
FIG. 2 shows a cut-away view of the system of FIG. 1 along the lines 2—2.
Figure 3:
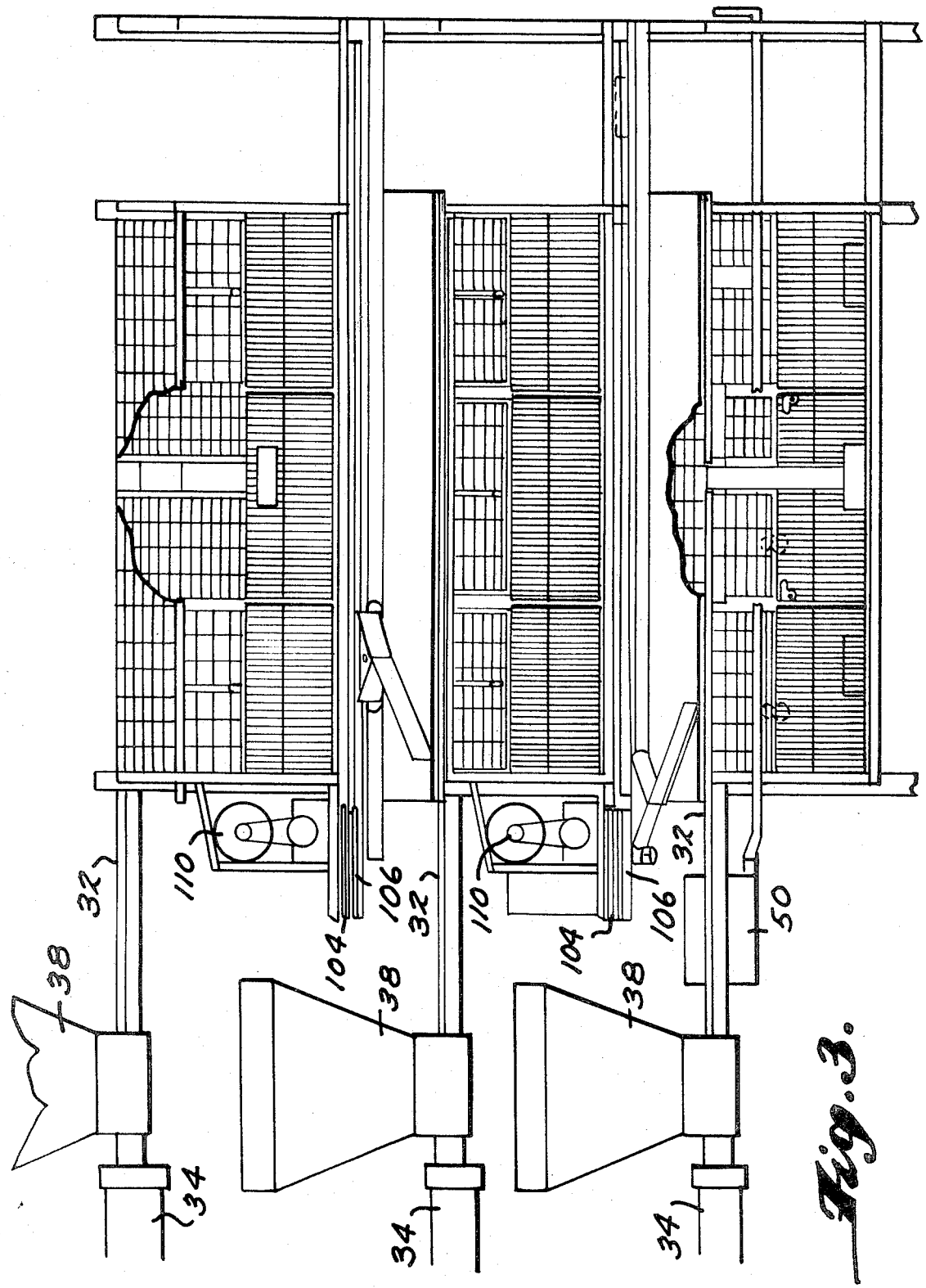
FIG. 3 illustrates a side view of the system of FIG. 1.

Reference is now made to FIGS. 1-3 which illustrate one embodiment of the novel system of this invention for raising and transporting animals such as poultry. As can be seen, in FIG. 1 and 3, the system comprises a plurality of rows of novel cages or coops of this invention with two groups of cages each comprised of three tiers of rows disposed adjacent each other and mounted on a framework. Tier 20 which is comprised of two adjacent rows of cages is mounted above tier 22 which is in turn mounted above tier 24, which is mounted above dropping-receiving troughs 26 and 28.

As mentioned above and described in detail below, each of the cages or coops in these rows have an open top while the fowl or other animals are growing with food and water being provided by drop tubes which extend through the open top into the cages. A food trough 32 extends between the two rows in each of tiers 20, 22 and 24 with a conventional auger 36 disposed in trough 32 for conveying solid food such as pellets to the fowl in the individual cages, each auger 36 is operated by a drive motor 34 which is diagrammatically illustrated in FIG. 3 to transport feed material from a conventional hopper 38 along trough 34 as auger 36 is rotated.

Novel drop tubes 40 are pivotably attached to trough 32 as can be seen in FIG. 2, so as to extend into each of the coops or cages in the tier which that trough serves.

Figure 4:
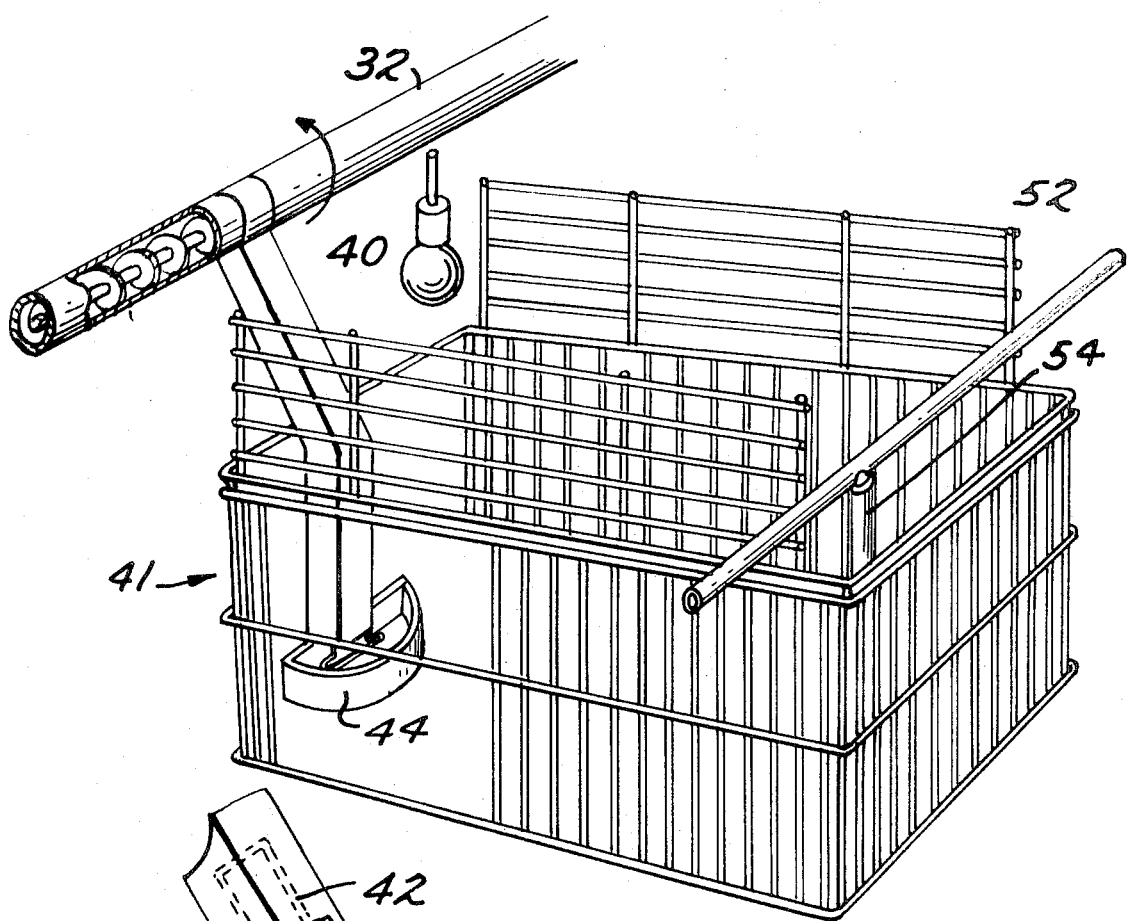
FIG. 4 illustrates a perspective view with one of the cages, partially cut away to illustrate the drop tubes for water and solid food.

FIG. 4 shows a typical cage 41 with a drop tube 40 disposed therein and with portions of the cage shown removed to illustrate how the drop tube furnishes food to the growing fowl. Drop tube 42 may simply be a hollow conduit made of sheet metal which has an opening in communication with trough 32, so that as auger 36 rotates and the food moves along the trough, some of the solid food spills over into drop tube 42 and falls by gravity into the pan 44 from which the fowl can feed.

Figure 5:
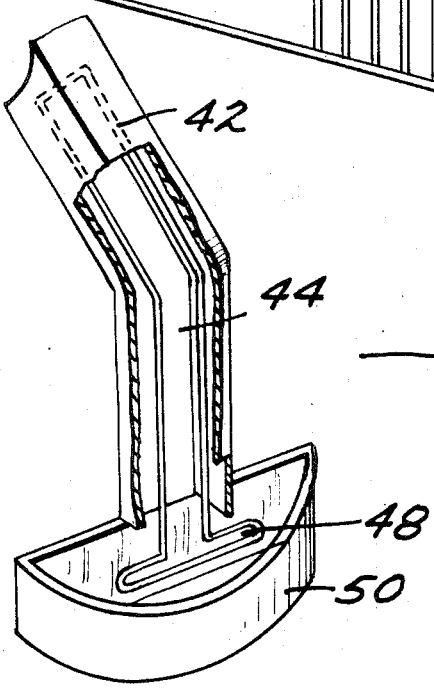
FIG. 5 shows a perspective view of one of the solid drop foods with a portion of the conduit removed to show the agitator wire.

As further shown in FIG. 5, drop tube 40, as well as the other drop tubes for the solid feed preferably includes an agitator wire 46 which extends within the tube and has a portion 48 extending into the feed pan portion 44. As the fowl peck at the food, agitator wire 48 is jiggled and this operates to prevent clogging of the food within drop tube 42.

Water is provided to each of the cages in each tier by a conventional float box system which includes a float box 50 which can be best seen in FIG. 3, and a line 52 which extends along the side of each row in each tier with drop tubes 54 extending from line 52 into the individual cages. If desired, peck water or heart cups can be attached to drop tubes 54. Tubes 54, like drop tubes 42, are pivotable about their attachment to line 52 for removal from the cage through the open top as described below.

As can be seen in FIGS. 1,2,3,4 and 7, each cage of this invention is preferably comprised of a floor, four walls comprised of vertical and horizontal bars extending up from that floor, and two further members which are attached to opposing walls of the cage for permitting full grow-out of the fowl and at the same time closing the cage at a satisfactory height for transportation when grow-out is completed. Floor 60 of the cage is preferably comprised of plastic for preventing breast blisters and other problems as described above.

As can be seen in FIG. 7, top closing members 62 and 64 are preferably comprised like the walls 66, 68, 70 and 72 of a plurality of vertical and horizontal bars which are connected together by any suitable fashion to form a barrier through which the chickens cannot escape but through which they can be readily observed during grow-out. Members 62 and 64 are attached to opposing walls 68 and 72 by clips 74, 76, 78 and 82. Clip 74 and the manner in which member 62 is pivotable about it to shift from a vertical position, defining a vertical extension of wall 68 to a horizontal position closing the top of the cage for transportation can be best seen in FIG. 6. As shown therein, clip 74 has a U-shaped portion 78 defining a substantially horizontal channel in which two bars 82 and 84 of member 62 can move. Clip 74 further in conjunction with wall 68 defines a vertical channel 88 which is in communication with the horizontal channel formed by portion 78 so that bars 82 and 84 and accordingly member 62 can be moved from the horizontal to the vertical channel and vice-versa to open and close the cage top. When the member 62 is in the illustrated position closing the cage top, a vertical force such as would be exerted by a fowl in the cage will not open the top and such opening can be accomplished only by moving member 62 horizontally to pivot about clip 74 and move to the position illustrated in dotted lines. A spring member 90 is preferably provided to hold member 62 in the horizontal position closing the top of the cage or coop. Clips 76, 78, and 80 operate similarly to hold members 62 and 64. Thus, as can be seen in FIG. 3, members such as 62 and 64 provide a vertical extension of the cage and provide sufficient volume therein for the full grow-out of fowls, while at the same time the cage dimension can be easily and simply reduced to a height that is satisfactory for transportation. Further, providing an open top on the cage permits feeding through that top by means of drop tubes which can be simply and easily removed when grow-out has been completed.

The open tops on those tiers below the top tier are closed by drop boards 99 which are removably connected to the frame as shown in FIG. 1. The drop boards are disposed at an angle for most efficient removal of the fowl droppings, and the drop boards can be removed if desired when the fowl are to be transported.

For each of the drop boards 99 a system is provided for scraping the droppings from the board periodically to troughs 26 and 28 below the tiers. Referring to FIG. 2, a scraper blade 100 is attached by a suitable framework to an endless belt 102 which is driven by pulleys 104 and 106 which are in turn rotated by a conventional motor 110 shown in FIG. 3. Similarly, scraper blade 110 is likewise attached to belt 102 for scraping the dropping board of the associated row on the same tier although moving at the opposite direction. An interrupt switch is preferably provided at each end of travel of the wiper blade for automatically disconnecting the motor when the wiper blade has moved the full distance along the associated dropping board.

The cages in tiers 20, 22 and 24, are mounted for movement along the length of rails such as rails 120 and 122 for easy removal of the fowl for transportation. When grow out has been completed, the drop tubes can be pivoted upward as shown in the middle tier 22, FIG. 1, together with the water-drop tubes out of the cages. The tops of the cages can then be closed as shown in FIG. 7 to a height suitable for transportation. A simple bracket can be attached either in place of or in addition to the scraper blade on the drop board which is immediately below the row which is to be transported with the attachment engaging the ends of the coops or cages as shown in dashed lines for scraper 130 in FIG. 1. The scraper mechanism can then be activated so that the bracket or the like pushes the cages one by one off the ends of rails, the rails on which they ride, at which time they can be manually stacked on a truck or the like for transportation to a central location.

Many changes and modifications in the above embodiments of the invention are, of course, possible without departing from the scope of that invention. Accordingly, that scope is intended to be limited only by the scope of the appended claims.

What is claimed is:

1. An animal raising system comprising:
   frame means,
   a plurality of cages disposed on said frame means, each having an opening at the top thereof,
   feed means for supplying food to the animals in said cages, and
   means for mounting said feed means adjacent said cages so that said feed means can be shifted from a first position in which portions of said feed means extend into each of said cages through said openings to supply food to a second position in which said portions do not extend into said cages through said openings.

2. A system as in claim 1 wherein said feed means includes means for providing solid food and means for providing water.

3. A system as in claim 1 wherein each said cage includes:
   a first member defining the cage floor,
   a plurality of members attached to said first member defining the cage walls,
   second and third members each pivotably attached to one of said plurality of member and each movable from a first position providing a vertical extension of the member to which it is attached and an opening at the top of said cage to a second position closing the top of said cage for transporting the animals therein.

4. A system as in claim 3 further including means connected between said second and third members and adjoining wall defining members for maintaining said second and third members in said second closed position.

5. A system as in claim 4 wherein said second and third members each include a plurality of parallel extending bars and wherein said maintaining means each includes first and second clip members attached to opposing wall defining members and having a first U-shaped portion with a substantially horizontal channel for receiving at least one of said parrallel bars of one of said second and third members for holding that member in said second closed position and a second portion defining with the wall member a substantially vertical channel for receiving at least one of said parallel bars for holding that member in said first open position, said channels being in communication so that the bars be slid from one channel to the other to move said second and third members from said first to said second position and vice versa, and spring means connecting said second and third members to said opposing wall defining members.

6. A system as in claim 5 wherein said first cage floor defining member is plastic.

7. A system as in claim 1 wherein said frame includes at least first and second parallel extending rails with said cages resting on said rails so as to permit movement of said cages along the lengths of said rails.

8. A system as in claim 1 wherein said cages are arranged in a plurality of rows of cages with the rows disposed one above the other and further including at least one member having animal dropping collecting surface disposed below at least one of said rows and closing the tops of the cages in the row below said member.

9. A system as in claim 8 further including means for removing droppings from said collecting surface.

10. A system as in claim 9 wherein said removing means includes a scraping blade and means for moving said blade along said collecting surface.

11. A system as in claim 10 wherein said frame includes first and second extending rails on which said cages rest and includes a member to said moving means for engaging said cages in the row above said collecting surface and moving said cages along said rails.

12. A system as in claim 1, wherein said mounting means includes a trough and wherein said feed means includes means disposed within said trough for moving solid food along said trough and a plurality of drop tubes each pivotably attached to said trough so as to extend through a cage opening into that cage and supply said solid food and so as to be pivotable about said trough out of that cage.

13. A system as in claim 12 further including an agitator wire in each of said drop tubes.

14. A system as in claim 12 further including a water line, a plurality of water drop tubes pivotably attached to said line so as to extend through a cage opening into that cage and supply water and so as to be pivotable about said line out of that cage.

15. A system as in claim 12 further including means for adjusting the vertical position of said trough and hence the vertical positions of said drop tubes.

16. A system as in claim 12 including at least first and second adjacent rows of cages with said trough disposed between said rows.

17. A system as in claim 12 wherein said moving means includes an auger and motor means for rotating said auger.

* * * * *